US010095322B1

(12) United States Patent
Li et al.

(10) Patent No.: US 10,095,322 B1
(45) Date of Patent: Oct. 9, 2018

(54) MOUSE ROLLER MODULE

(71) Applicant: Primax Electronics Ltd., Taipei (TW)

(72) Inventors: Ya-Jun Li, Taipei (TW); Chun-Cheng Lu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/654,264

(22) Filed: Jul. 19, 2017

(30) Foreign Application Priority Data

Mar. 22, 2017 (CN) .......................... 2017 1 0173604

(51) Int. Cl.
*G09G 5/08* (2006.01)
*G06F 3/0354* (2013.01)
*G06F 3/0362* (2013.01)

(52) U.S. Cl.
CPC ........ *G06F 3/03543* (2013.01); *G06F 3/0362* (2013.01); *G06F 3/03541* (2013.01); *G06F 2203/0333* (2013.01)

(58) Field of Classification Search
CPC .. G06F 3/02; G06F 3/033; G09G 5/08; G09G 5/00
See application file for complete search history.

(56) References Cited

U.S. PATENT DOCUMENTS

| 6,344,643 | B1 * | 2/2002 | Chen ..................... G06F 3/0312 250/221 |
| 6,798,397 | B2 * | 9/2004 | O'Keeffe ............ G06F 3/03543 345/163 |
| 7,199,353 | B2 * | 4/2007 | Chalyan ............. G01D 5/34738 200/61.54 |
| 7,508,372 | B2 * | 3/2009 | Blandin ................ G06F 3/0312 345/156 |
| 7,616,188 | B1 * | 11/2009 | Blandin .............. G06F 3/03543 345/163 |

FOREIGN PATENT DOCUMENTS

| TW | I448928 B | 8/2014 |
| TW | M498914 U | 4/2015 |

* cited by examiner

*Primary Examiner* — Pegeman Karimi
(74) *Attorney, Agent, or Firm* — Muncy, Geissler, Older & Lowe, P.C.

(57) ABSTRACT

A mouse roller module includes a roller, a swinging arm, a movable block and an adjusting device. The roller includes a recess with a toothed surface. The swinging arm includes a contacting part, a linking part and an adjusting part. The contacting part is connected with a first elastic element. In response to an elastic force of the first elastic element, the contacting part provides a pressing force to the toothed surface. When the adjusting part is pushed by the movable block, the swinging arm performs a swinging motion. The movable block is pushed by the piston. While the position of the piston is adjusted by the adjusting device, the movable block is moved and the swinging arm performs the swinging motion. The pressing force of the contacting part provided to the toothed surface is adjusted in response to the swinging motion.

11 Claims, 7 Drawing Sheets

MOUSE ROLLER MODULE

FIELD OF THE INVENTION

The present invention relates to a roller module, and more particularly to a roller module for an input device.

BACKGROUND OF THE INVENTION

A mouse is used to control a cursor on a computer screen in order to operate the computer. Since 1968, the United States has produced the world's first mouse. After then, the mouse is applied to paper processing operations, video games, industrial drawings, drawing design or media production. Consequently, the mouse has become an indispensable part of the computer system. In the early stage, the mouse uses a trackball to detect the displacement of the mouse. With increasing development of science and technology, an optical module or a laser module is used to detect the displacement of the mouse in order to enhance the working efficiency. Moreover, for increasing the functionality and convenience of the mouse, the earliest wired single-button mouse is gradually evolved into the modern wireless multi-button roller mouse. For complying with different industrial needs or personal preferences, various electronic manufacturers have begun to create a variety of mouse devices with different shapes in order to meet the operation requirements of different users. Consequently, people pay much attention to the comfort and sensitivity of pressing or operating the left button, the right button and the middle button.

In addition to the left button and the right button, a roller of the mouse is another kind of button that is frequently used by the user of the computer. For example, by rotating the roller, the function of browsing web pages or moving the cursor is achieved. Alternatively, by pressing the roller, a middle button signal is generated or the function of switching different operation mode is achieved. For increasing the convenience and comfort of operating the roller, a roller module of an input device is disclosed in Taiwanese Patent No. 1448928. In the roller module, a recess or a hollow slot of the roller is equipped with one or two different toothed surfaces. When a swinging arm is contacted with one of the toothed surfaces, the rotation of the roller generates different tactile feels. Moreover, a hyper-fast roller structure of a mouse is disclosed in Taiwanese Patent No. M498914. A tooth part and a stopping rod are installed in the roller module. In case that the stopping rod is pushed by a torsion spring, the stopping rod is in close contact with the tooth part. When a button linked with the stopping rod is operated by the user, the roller is switched between a hyper-fast scrolling mode and an ordinary scrolling mode. However, the conventional technologies still have some drawbacks. For example, only some default scrolling modes are provided for the user to switch the operation mode of the roller. Moreover, the consumers cannot adjust the default scrolling modes according to their requirements or the preferences. Consequently, the consumer has to spend more time in searching the suitable mouse. If the mouse is not suitable, the working efficiency is deteriorated.

For allowing the mouse roller button to comply with different users, there is a need of providing a mechanism for finely tuning the mouse roller.

SUMMARY OF THE INVENTION

The present invention provides a mouse roller module. A pressing force on a roller of the mouse is adjustable according to the preference or working requirement of the user. Consequently, the user can adjust the roller to achieve the required tactile feel or operation mode. That is, the operation mode of the roller is diversified.

In accordance with an aspect of the present invention, there is provided a mouse roller module. The mouse roller module includes a roller, a swinging arm, a movable block and an adjusting device. The roller includes a recess. The recess has a toothed surface. The swinging arm includes a contacting part, a linking part and an adjusting part. The contacting part is connected with a first elastic element. The first elastic element provides an elastic force to the contacting part. Consequently, the contacting part provides a pressing force to the toothed surface. When the adjusting part is pushed by the movable block, the swinging arm performs a swinging motion by using the linking part as a fulcrum. The adjusting device is used for adjusting a position of a piston. The movable block is pushed by the piston. While the position of the piston is adjusted by the adjusting device, the movable block is moved and the swinging arm performs the swinging motion. The pressing force of the contacting part provided to the toothed surface is adjusted in response to the swinging motion.

In an embodiment, the toothed surface is formed on an inner periphery of the recess, or the toothed surface is formed on an external periphery of a fixing shaft within the recess.

In an embodiment, the first elastic element is a torsion spring.

In an embodiment, the movable block is connected with a second elastic element, and the second elastic element provides an elastic force to the movable block, wherein the movable block is moved in a direction of the elastic force of the second elastic element.

In an embodiment, the movable block includes a first slant surface to push the piston.

In an embodiment, the piston includes a second slant surface to push the movable block.

In an embodiment, the movable block includes a first slant surface, and the piston includes a second slant surface corresponding to the first slant surface.

In an embodiment, the adjusting device includes an adjusting gear and a nut.

In an embodiment, the adjusting gear includes a screw with an external thread structure, and the nut includes a channel with an inner thread structure corresponding to the external thread structure.

In an embodiment, the nut includes an outer toothed structure, and the outer toothed structure is engaged with the piston, so that the nut is linked with the piston.

In an embodiment, the piston includes a toothed hole, and the toothed hole is engaged with the outer toothed structure of the nut.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
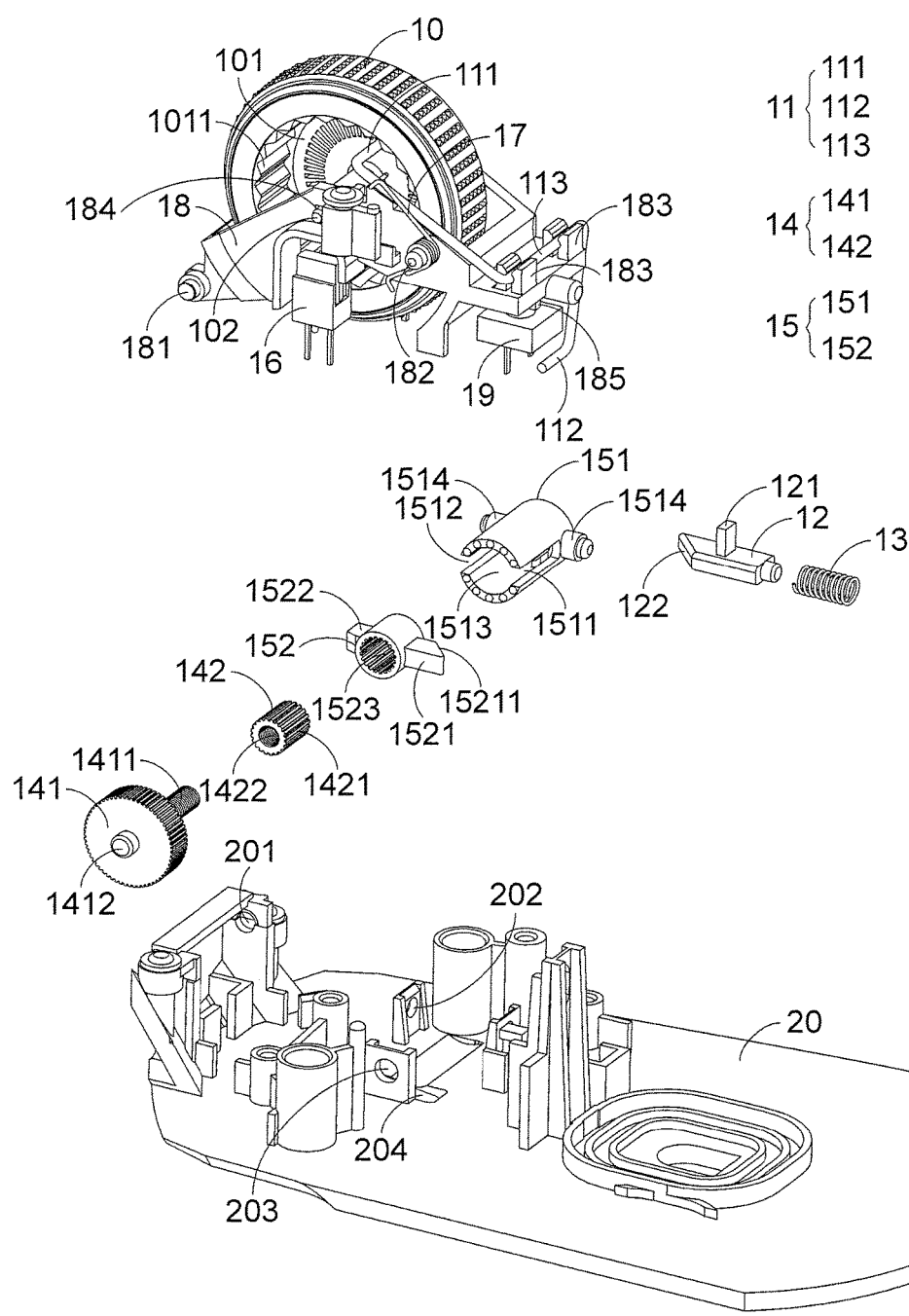
FIG. 1 is a schematic exploded view illustrating a mouse roller module according to an embodiment of the present invention.

FIG. 1 is a schematic exploded view illustrating a mouse roller module according to an embodiment of the present invention. As shown in FIG. 1, the mouse roller module comprises a roller 10, a swinging arm 11, a bracket 18, a movable block 12, an adjusting device 14, a piston sheath assembly 15, a sensing element 16 and a bottom cover 20. The roller 10 comprises a recess 101 and a fixing shaft 102. An inner periphery of the recess 101 has a toothed surface 1011. The bracket 18 comprises a pivotal shaft 181, a fixing rod 182, a supporting structure 183, a pivotal hole 184 and a push post 185. The pivotal shaft 181 is pivotally coupled to a bracket positioning hole 201 of the bottom cover 20. Consequently, the bracket 18 is movable upwardly or downwardly by using the pivotal shaft 181 as a fulcrum. When the bracket 18 is moved downwardly, the push post 185 is moved downwardly to push the underlying middle button switch 19. Consequently, a middle button signal is outputted to an electronic device or a computing device (not shown) that is in communication with the mouse. For example, the electronic device or the computing device is a notebook computer or a personal computer. The pivotal hole 184 is connected with the fixing shaft 102 of the roller 10. Consequently, the roller 10 can be freely rotated with respect to the bracket 18. While the roller 10 is rotated, a rotating distance and a rotating speed of the roller 10 are sensed by the sensing element 16. Consequently, a roller signal is outputted to the electronic device or the computing device that is in communication with the mouse. For example, the electronic device or the computing device is a notebook computer or a personal computer. An example of the sensing element 16 is an infrared sensor.

Please refer to FIG. 1 again. The swinging arm 11 comprises a contacting part 111, an adjusting part 112 and a linking part 113. The linking part 113 is pivotally coupled to the supporting structure 183 of the bracket 18. Consequently, the swinging arm 11 performs a swinging motion by using the linking part 113 as a fulcrum. The contacting part 111 is inserted into the recess 101 of the roller 10. A first elastic element 17 is installed on the fixing rod 182. In response to an elastic force from the first elastic element 17, the contacting part 111 is engaged with the toothed surface 1011 of the recess 101. An example of the first elastic element 17 is a torsion spring. The adjusting part 112 is contacted with a stopping part 121 of the movable block 12. Consequently, the swinging arm 11 is linked with the movable block 12. An end of the movable block 12 is connected with a second elastic element 13. An example of the second elastic element 13 is a spring. In response to an elastic force of the second elastic element 13, the movable block 12 is moved. The movable block 12 comprises a first slant surface 122. As the movable block 12 is moved, the swinging arm 11 performs the swinging motion. In response to the swinging action of the swinging arm 11, a pressing force of the contacting part 111 on the toothed surface 1011 is adjusted or the contacting part 111 is moved away from the toothed surface 1011. Since the pressing force of the contacting part 111 on the toothed surface 1011 is adjustable, the user can sense different tactile feels according to the difference of the pressing force while the roller 10 is used. When the contacting part 111 is moved away and not contacted with the toothed surface 1011, the operation mode of the roller 10 is switched to the hyper-fast scrolling mode. Under this circumstance, the roller 10 can be rotated quickly. For example, the pages of the computer screen can be quickly scrolled.

Figure 2:
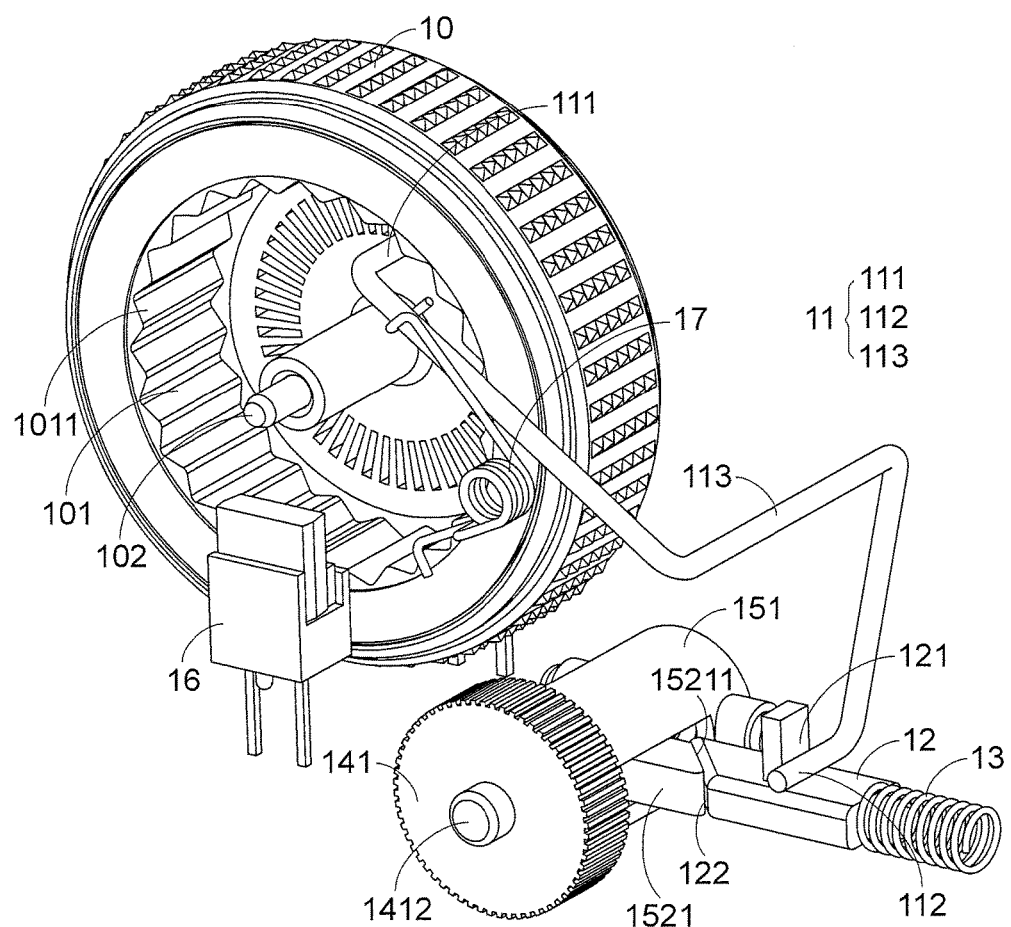
FIG. 2 is a schematic perspective view illustrating the relationship between the adjusting device and associated components of the mouse roller module according to the embodiment of the present invention.

Please refer to FIGS. 1 and 2. FIG. 2 is a schematic perspective view illustrating the relationship between the adjusting device and associated components of the mouse roller module according to the embodiment of the present invention. The adjusting device 14 comprises an adjusting gear 141 and a nut 142. The adjusting gear 141 comprises a screw 1411 and a gear positioning element 1412. The gear positioning element 1412 is pivotally coupled to a gear positioning hole 203 of the bottom cover 20. A portion of a peripheral region of the adjusting gear 141 is exposed to an opening 204 of the bottom cover 20. The nut 142 comprises an outer toothed structure 1421 and a channel 1422. The channel 1422 comprises an inner thread structure corresponding to an external thread structure of the screw 1411. The piston sheath assembly 15 comprises a sleeve 151 and a piston 152. The piston 152 comprises a push block 1521, a guiding block 1522 and a toothed hole 1523. The toothed hole 1523 is aligned with the outer toothed structure 1421 of the nut 142. The push block 1521 comprises a second slant surface 15211 corresponding to the first slant surface 122 of the movable block 12. As the movable block 12 is pushed by the push block 1521, the movable block 12 is moved in the direction of the elastic force of the second elastic element 13. The sleeve 151 comprises a first positioning notch 1511, a second positioning notch 1512, a chamber 1513 and a sleeve positioning part 1514. The chamber 1513 is used for accommodating the piston 152. Moreover, the piston 152 can be moved within the chamber 1513 back and forth. The push block 1521 is linked with piston 152. Moreover, the push block 1521 is movable within the first positioning notch 1511. The guiding block 1522 is also linked with piston 152. Moreover, the guiding block 1522 is movable within the second positioning notch 1512. The sleeve positioning part 1514 is connected with a sleeve positioning hole 202 of the bottom cover 20. The outer toothed structure 1421 of the nut 142 of the adjusting device 14 is engaged with the toothed hole 1523 of the piston 152. Consequently, the nut 142 and the piston 152 are combined and linked with each other. When the adjusting gear 141 is rotated in a clockwise direction or a counterclockwise direction by the user, the screw 1411 drives rotation of the nut 142. Consequently, the piston 152 is moved within the chamber 1513 of the sleeve 151 back and forth. In this embodiment, the user can rotate the adjusting gear 141 through the opening 204 of the bottom cover 20 or open a top cover (not shown) of the mouse to rotate the adjusting gear 141. Moreover, the position of the adjusting gear 141 in the mouse is varied according to the shape of the adjusting gear 141 or the linkage between the adjusting gear 141 and other components. It is noted that the implementation examples are not restricted.

Figure 3A:
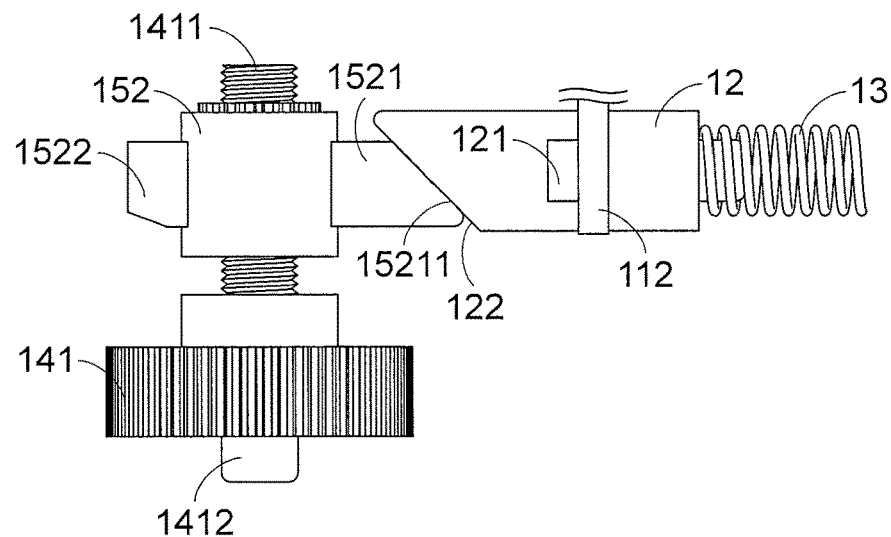
FIGS. 3A, 3B and 3C are schematic top views illustrating the relationship between the adjusting device and associated components of the mouse roller module according to the embodiment of the present invention.
Figure 3B:
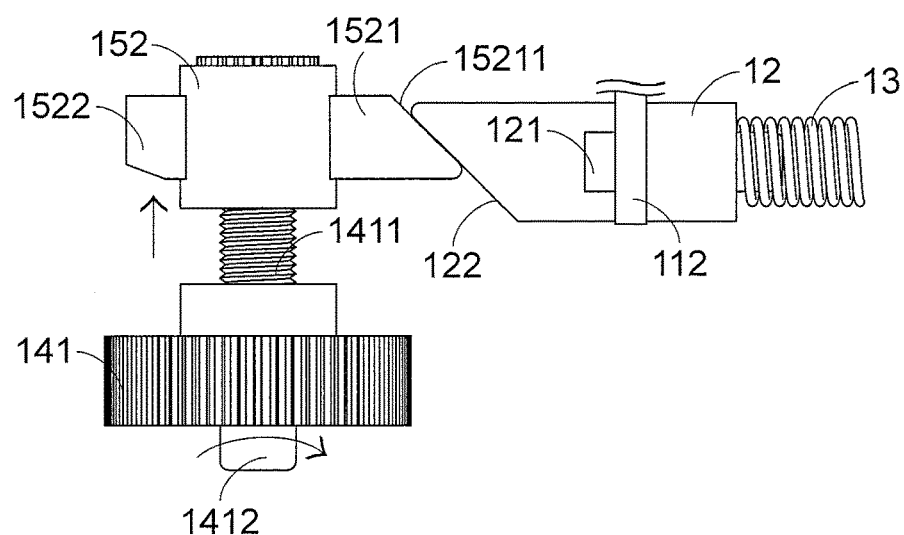
Figure 3C:
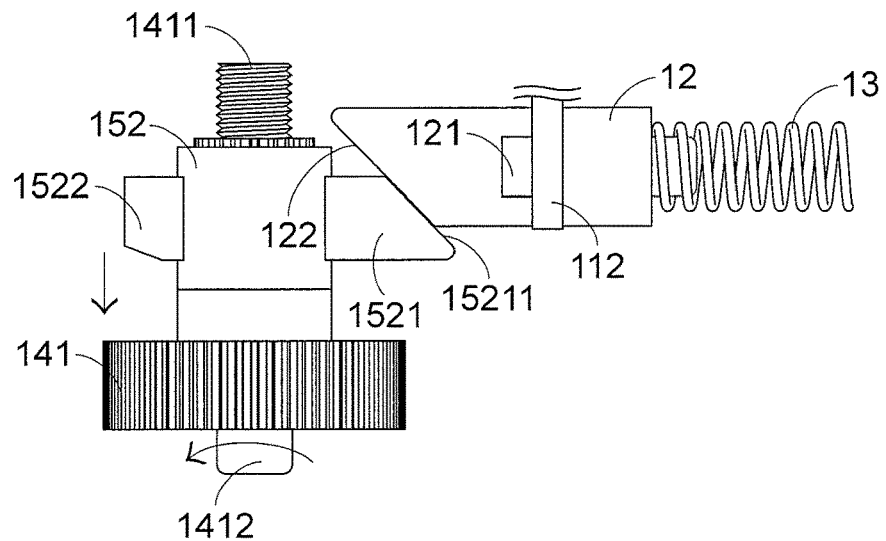

FIGS. 3A, 3B and 3C are schematic top views illustrating the relationship between the adjusting device and associated components of the mouse roller module according to the embodiment of the present invention. As shown in FIG. 3A, the adjusting device 14 comprises the adjusting gear 141 and the nut 142. The adjusting gear 141 is connected with the piston 152 through the screw 1411 and the nut 142 (see FIG. 1). The guiding block 1522 is located at a first side of the piston 152. The push block 1521 is located at a second side of the piston 152. The second slant surface 15211 of the push block 1521 is contacted with the first slant surface 122 of the movable block 12. The second elastic element 13 is connected with an end of the movable block 12 so as to provide an elastic force to the movable block 12. Consequently, the movable block 12 is moved in the direction of the elastic force of the second elastic element 13. The stopping part 121 of the movable block 12 is contacted with the adjusting part 112 of the swinging arm 11.

Please refer to FIG. 3B. As the adjusting gear 141 is rotated in the clockwise direction by the user, the piston 152 is pushed by the screw 1411 and moved upwardly. Meanwhile, the first slant surface 122 of the movable block 12 is pushed by the second slant surface 15211 of the push block 1521. Consequently, the movable block 12 is moved in the right direction. As the movable block 12 is moved in the right direction, the adjusting part 112 of the swinging arm 11 is pushed by the stopping part 121 of the movable block 12. Consequently, the adjusting part 112 of the swinging arm 11 is moved in the right direction. Meanwhile, the second elastic element 13 is compressed in response to the pushing force.

Please refer to FIG. 3C. As the adjusting gear 141 is rotated in the counterclockwise direction by the user, the piston 152 is driven by the screw 1411 and moved downwardly. Meanwhile, the elastic force of the second elastic element 13 is released. Consequently, the first slant surface 122 of the movable block 12 is moved along the second slant surface 15211 of the push block 1521 in the left direction. As the movable block 12 is moved in the left direction, the adjusting part 112 of the swinging arm 11 is moved in the left direction. Consequently, the movable distance of the adjusting part 112 is limited by the stopping part 121 of the movable block 12.

Moreover, the rotating direction of the adjusting gear 141 may be adjusted according to the external thread structure of the screw 1411 or the inner thread structure of the channel 1422 of the nut 142. It is noted that numerous modifications and alterations may be made while retaining the teachings of the invention. In the above embodiment, the movable block 12 comprises the first slant surface 122, and the push block 1521 of the piston 152 comprises the second slant surface 15211. In another embodiment, any of the movable block 12 and piston 152 is equipped with the slant surface to be pushed.

Figure 4A:
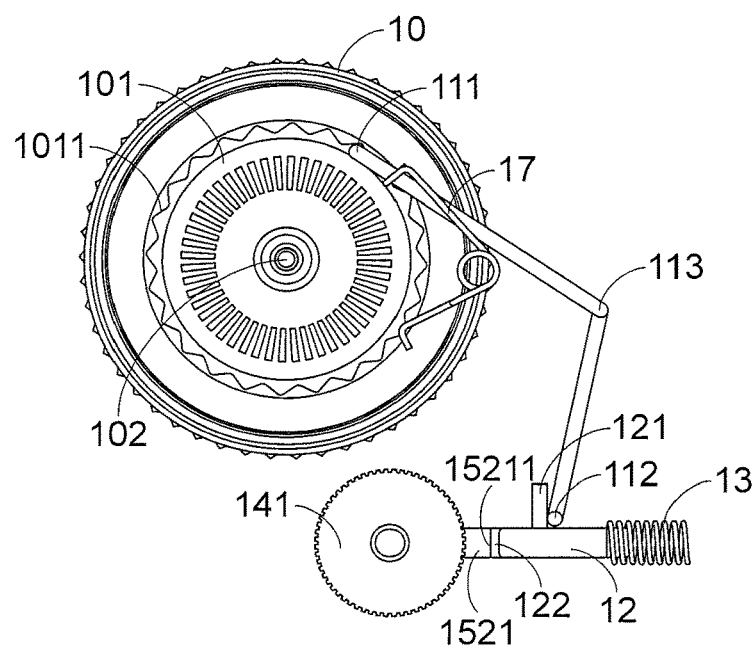
FIGS. 4A, 4B and 4C are schematic side views illustrating the actions of the swinging arm of the mouse roller module according to the embodiment of the present invention.
Figure 4B:
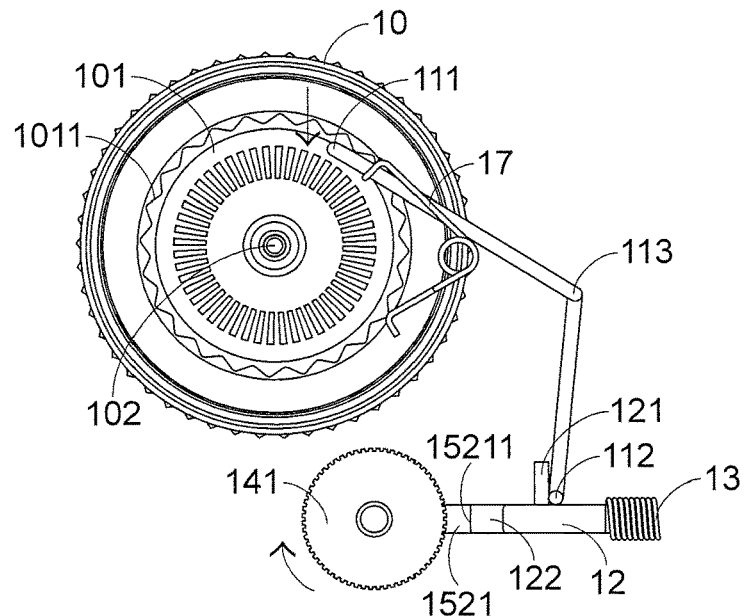
Figure 4C:
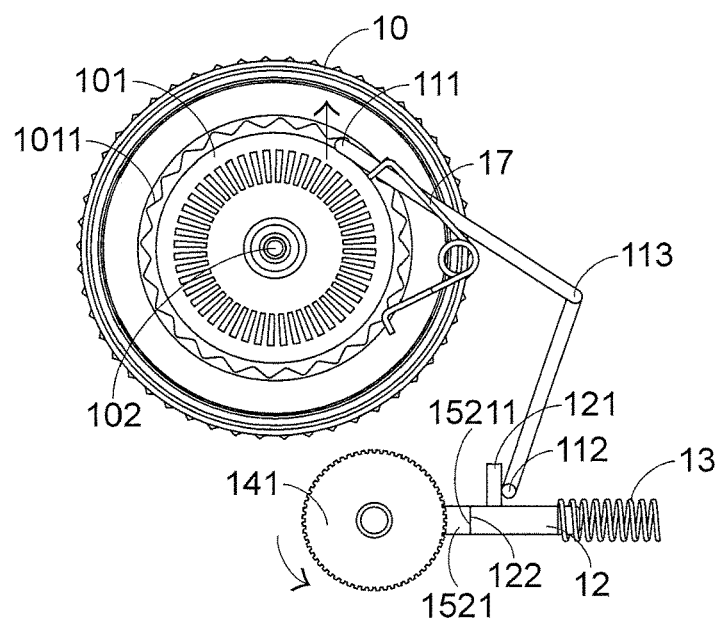

FIGS. 4A, 4B and 4C are schematic side views illustrating the actions of the swinging arm of the mouse roller module according to the embodiment of the present invention. Please refer to FIG. 4A. The adjusting gear 141 is used for adjusting the position of the push block 1521. Consequently, the second slant surface 15211 of the push block 1521 is contacted with the first slant surface 122 of the movable block 12. Moreover, the second elastic element 13 is connected with the movable block 12 so as to provide the elastic force to the movable block 12. Consequently, the movable block 12 is moved in the direction of the elastic force of the second elastic element 13. The stopping part 121 of the movable block 12 is contacted with the adjusting part 112 of the swinging arm 11. Moreover, the contacting part 111 is located at an opposite end of the adjusting part 112 and disposed within the recess 101 of the roller 10. In response to the elastic force from the first elastic element 17, the contacting part 111 is engaged with the toothed surface 1011 of the recess 101. Moreover, the swinging arm 11 may perform a swinging motion by using the linking part 113 as a fulcrum.

Please refer to FIG. 4B. As the adjusting gear 141 is rotated in the clockwise direction by the user, the movable block 12 is pushed by the push block 1521. Consequently, the movable block 12 is moved in the right direction (see also FIG. 3B). As the adjusting part 112 of the swinging arm 11 is pushed by the stopping part 121 of the movable block 12, the swinging arm 11 performs the swinging motion by using the linking part 113 as the fulcrum. Consequently, the contacting part 111 of the swinging arm 11 is moved away from the toothed surface 1011 of the roller 10, or the pressing force of the contacting part 111 on the toothed surface 1011 is decreased. In case that the pressing force of the contacting part 111 is decreased, the tactile feel of operating the roller 10 is decreased when the roller 10 is used by the user. In case that the contacting part 111 is moved away from the toothed surface 1011 and separated from the toothed surface 1011, the operation mode of the roller 10 is switched to the hyper-fast scrolling mode. Under this circumstance, the roller 10 can be rotated quickly. Moreover, the tactile feel of operating the roller 10 is not generated when the roller 10 is used by the user.

Please refer to FIG. 4C. As the adjusting gear 141 is rotated in the counterclockwise direction by the user, the elastic force of the second elastic element 13 is released to push the movable block 12.

Consequently, the first slant surface 122 of the movable block 12 is moved along the second slant surface 15211 of the push block 1521 in the left direction (see also FIG. 3C). As the elastic force of the first elastic force 13 is released, the swinging arm 11 performs the swinging motion by using the linking part 113 as the fulcrum. Moreover, the adjusting part 112 of the swinging arm 11 is stopped by the stopping part 121 of the movable block 12. Since the elastic force of the first elastic force 13 is released, the pressing force of the contacting part 111 on the toothed surface 1011 is increased. In case that the pressing force of the contacting part 111 is increased, the tactile feel of operating the roller 10 is increased when the roller 10 is used by the user.

From the above descriptions, the pressing force of the contacting part 111 on the toothed surface 1011 of the swinging arm 11 can be adjusted by rotating the adjusting gear 141 according to the preference or working requirement of the user. Consequently, the user can adjust the roller 10 to achieve the required tactile feel or operation mode.

Figure 5A:
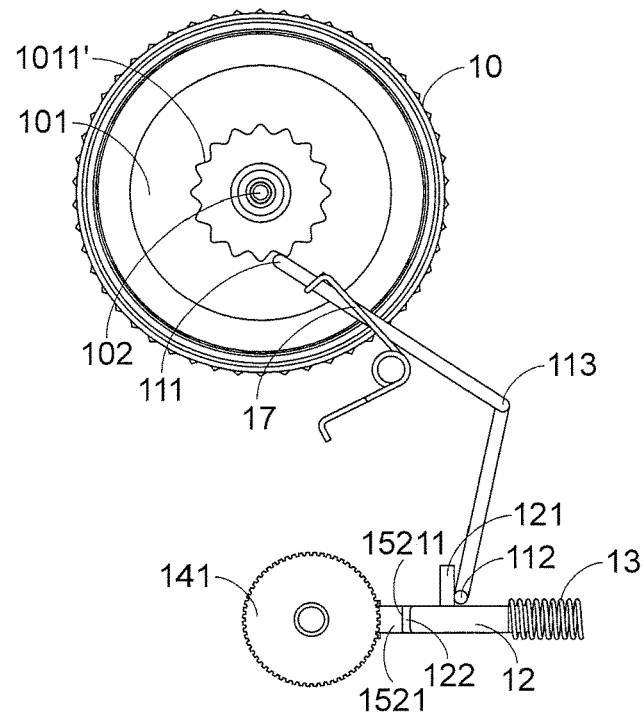
FIGS. 5A, 5B and 5C are schematic side views illustrating the actions of the swinging arm of the mouse roller module according to another embodiment of the present invention.
Figure 5B:
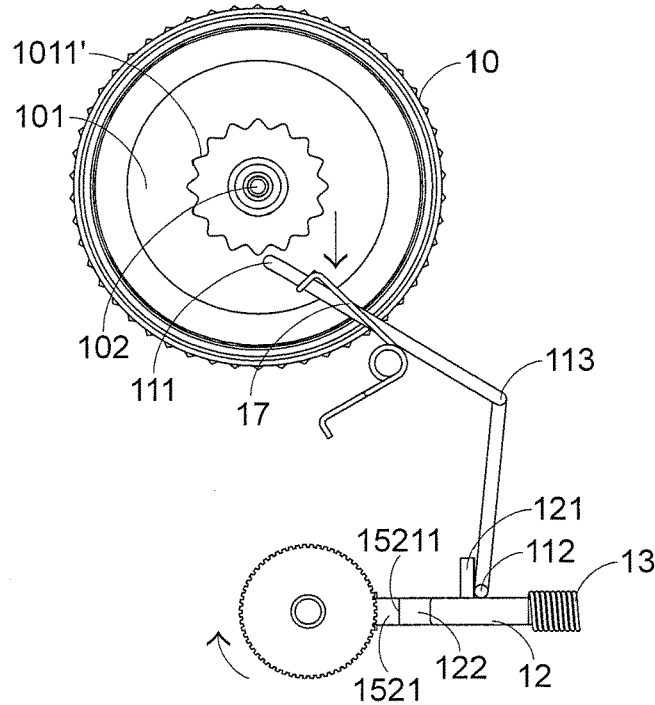
Figure 5C:
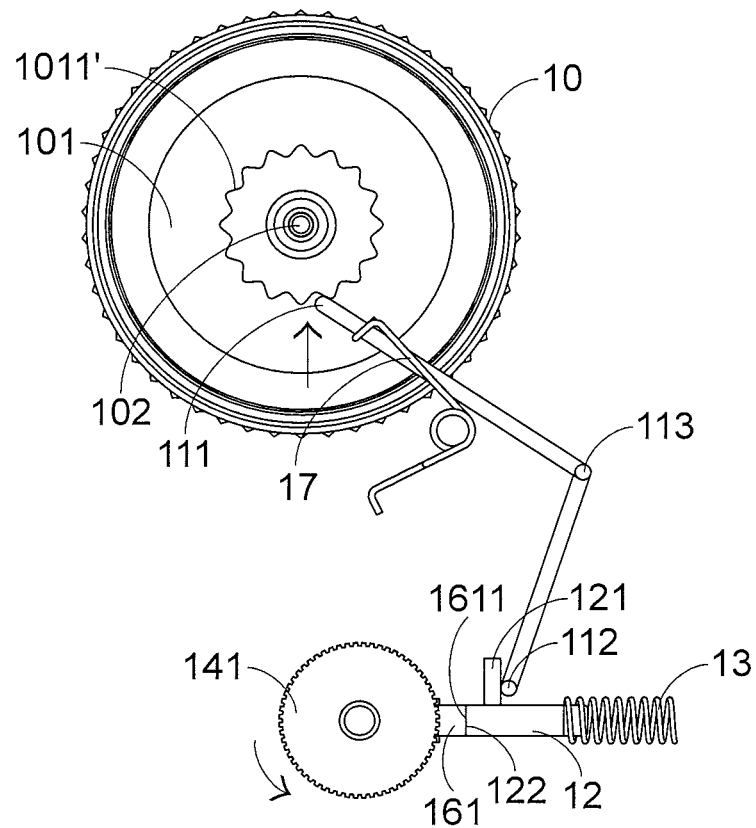

FIGS. 5A, 5B and 5C are schematic side views illustrating the actions of the swinging arm of the mouse roller module according to another embodiment of the present invention. Similarly, as shown in FIGS. 5A, 5B and 5C, the mouse roller module also comprises the adjusting gear 141, the push block 1521, the second slant surface 15211, the movable block 12, the first slant surface 122, the second elastic element 13, the stopping part 121, the swinging arm 11, the adjusting part 112, the contacting part 111, the roller 10, the recess 101, the first elastic element 17, the linking part 113, the roller 10 and the fixing shaft 102. The functions of these components are similar to those of FIGS. 4A, 4B and 4C, and are not redundantly described herein. In comparison with the above embodiment, the toothed surface 1011' of this embodiment is formed on an outer periphery of the fixing shaft 102. In response to the elastic force of the first elastic element 17, the contacting part 111 is engaged with the toothed surface 1011'. Please refer to FIG. 5B. In response to the swinging motion, the contacting part 111 of the swinging arm 11 is moved away from the toothed surface 1011' of the roller 10, or the pressing force of the contacting part 111 on the toothed surface 1011' is decreased. Please refer to FIG. 5C. In response to the swinging motion, the elastic force of the first elastic force 13 is released, and the pressing force of the contacting part 111 on the toothed surface 1011' is increased.

As previously described, the conventional mouse roller can only provide several fixed tactile feel modes. From the above descriptions, the present invention provides a novel mouse roller module. Since the pressing force of the swinging arm on the surface of the roller is adjustable through the adjusting device and the piston sheath assembly, the desired pressing force is obtained according to the preference or working requirement of the user. Consequently, the roller is operated in a suitable tactile feel mode. Since the operation mode of the roller is diversified, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse roller module, comprising:
   a roller comprising a recess, wherein the recess has a toothed surface;
   a swinging arm comprising a contacting part, a linking part and an adjusting part, wherein the contacting part is connected with a first elastic element, and the first elastic element provides an elastic force to the contacting part, so that the contacting part provides a pressing force to the toothed surface;
   a movable block, wherein when the adjusting part is pushed by the movable block, the swinging arm performs a swinging motion by using the linking part as a fulcrum; and
   an adjusting device for adjusting a position of a piston, wherein the movable block is pushed by the piston, wherein while the position of the piston is adjusted by the adjusting device, the movable block is moved and the swinging arm performs the swinging motion, wherein the pressing force of the contacting part provided to the toothed surface is adjusted in response to the swinging motion.

2. The mouse roller module according to claim 1, wherein the toothed surface is formed on an inner periphery of the recess, or the toothed surface is formed on an external periphery of a fixing shaft within the recess.

3. The mouse roller module according to claim 1, wherein the first elastic element is a torsion spring.

4. The mouse roller module according to claim 1, wherein the movable block is connected with a second elastic element, and the second elastic element provides an elastic force to the movable block, wherein the movable block is moved in a direction of the elastic force of the second elastic element.

5. The mouse roller module according to claim 1, wherein the movable block comprises a first slant surface to push the piston.

6. The mouse roller module according to claim 1, wherein the piston comprises a second slant surface to push the movable block.

7. The mouse roller module according to claim 1, wherein the movable block comprises a first slant surface, and the piston comprises a second slant surface corresponding to the first slant surface.

8. The mouse roller module according to claim 1, wherein the adjusting device comprises an adjusting gear and a nut.

9. The mouse roller module according to claim 8, wherein the adjusting gear comprises a screw with an external thread structure, and the nut comprises a channel with an inner thread structure corresponding to the external thread structure.

10. The mouse roller module according to claim 8, wherein the nut comprises an outer toothed structure, and the outer toothed structure is engaged with the piston, so that the nut is linked with the piston.

11. The mouse roller module according to claim 10, wherein the piston comprises a toothed hole, and the toothed hole is engaged with the outer toothed structure of the nut.

\* \* \* \* \*